United States Patent
Norton et al.

(10) Patent No.: US 9,625,684 B2
(45) Date of Patent: Apr. 18, 2017

(54) LENS LAMINATE AND METHOD

(71) Applicant: GOOGLE TECHNOLOGY HOLDINGS LLC, Mountain View, CA (US)

(72) Inventors: Jeffrey J. Norton, Crystal Lake, IL (US); Anthony P. Gallagher, Carpentersville, IL (US); Matthew R. Michieli, South Elgin, IL (US); John D. Shurboff, Lindenhurst, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 354 days.

(21) Appl. No.: 14/273,617

(22) Filed: May 9, 2014

(65) Prior Publication Data

US 2014/0334021 A1    Nov. 13, 2014

Related U.S. Application Data

(60) Provisional application No. 61/821,519, filed on May 9, 2013.

(51) Int. Cl.

| | | |
|---|---|---|
| *G02B 7/02* | (2006.01) | |
| *G02B 13/00* | (2006.01) | |
| *B32B 37/12* | (2006.01) | |
| *B32B 37/18* | (2006.01) | |
| *B32B 7/12* | (2006.01) | |
| *B32B 3/26* | (2006.01) | |
| *B32B 38/18* | (2006.01) | |

(52) U.S. Cl.
CPC .......... *G02B 13/0085* (2013.01); *B32B 3/266* (2013.01); *B32B 7/12* (2013.01); *B32B 37/1207* (2013.01); *B32B 37/18* (2013.01); *B32B 38/1841* (2013.01); *B32B 2037/1253* (2013.01); *B32B 2309/02* (2013.01); *B32B 2309/12* (2013.01); *B32B 2551/00* (2013.01); *Y10T 156/10* (2015.01); *Y10T 156/1052* (2015.01); *Y10T 156/1056* (2015.01)

(58) Field of Classification Search
CPC  G02B 13/0085; G02B 13/001; G02B 3/0006; G02B 3/0012; G02B 3/005; G02B 3/0062; G02B 3/0068; G02B 3/0075
See application file for complete search history.

(56) References Cited

U.S. PATENT DOCUMENTS

| | | |
|---|---|---|
| 4,184,006 A | 1/1980 | Hockemeyer et al. |
| 4,473,603 A | 9/1984 | Hockemeyer et al. |
| 7,969,656 B2 | 6/2011 | Yu |

(Continued)

OTHER PUBLICATIONS

Xuan Li, R. Wayne Johnson, Thomas E Noll, and Michael Watson, "Application of Spacer Filled Silicone Die Adhesive in Stacked Chip Technology," Proceedings of the 2003 International Microelectronics Conference, Boston, MA, Nov. 2003, pp. 194-199.

*Primary Examiner* — Joseph P Martinez
(74) *Attorney, Agent, or Firm* — Morris & Kamlay LLP

(57) ABSTRACT

An optical lens laminate has an adhesive member with at least one aperture, an optical member with an optical feature; and another optical member with an optical feature. The lens laminate may be made by positioning the at least one adhesive member between the optical members, with the apertures aligned with the lens features, and pressing the optical members together.

16 Claims, 4 Drawing Sheets

(56) References Cited

U.S. PATENT DOCUMENTS

2008/0180566 A1* 7/2008 Singh ............... H01L 27/14625
                                                    348/373
2011/0222161 A1   9/2011 Yoneyama et al.
2012/0068370 A1   3/2012 Saruya et al.

* cited by examiner

LENS LAMINATE AND METHOD

FIELD OF THE INVENTION

The present invention pertains to lens construction and to a multi-layer laminate lens construct.

BACKGROUND OF THE INVENTION

Wafer, or multi-layer, lens constructs may include various components such as optical members, filters, spacers, image sensors, and the like. Multiple layers are coupled during manufacture to create a module array. Manufacturing compact lens structures for portable devices continues to present a number of still unsolved challenges because the lens structures must be small in size, capable of mass manufacturing with great precision, and of suitable cost.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
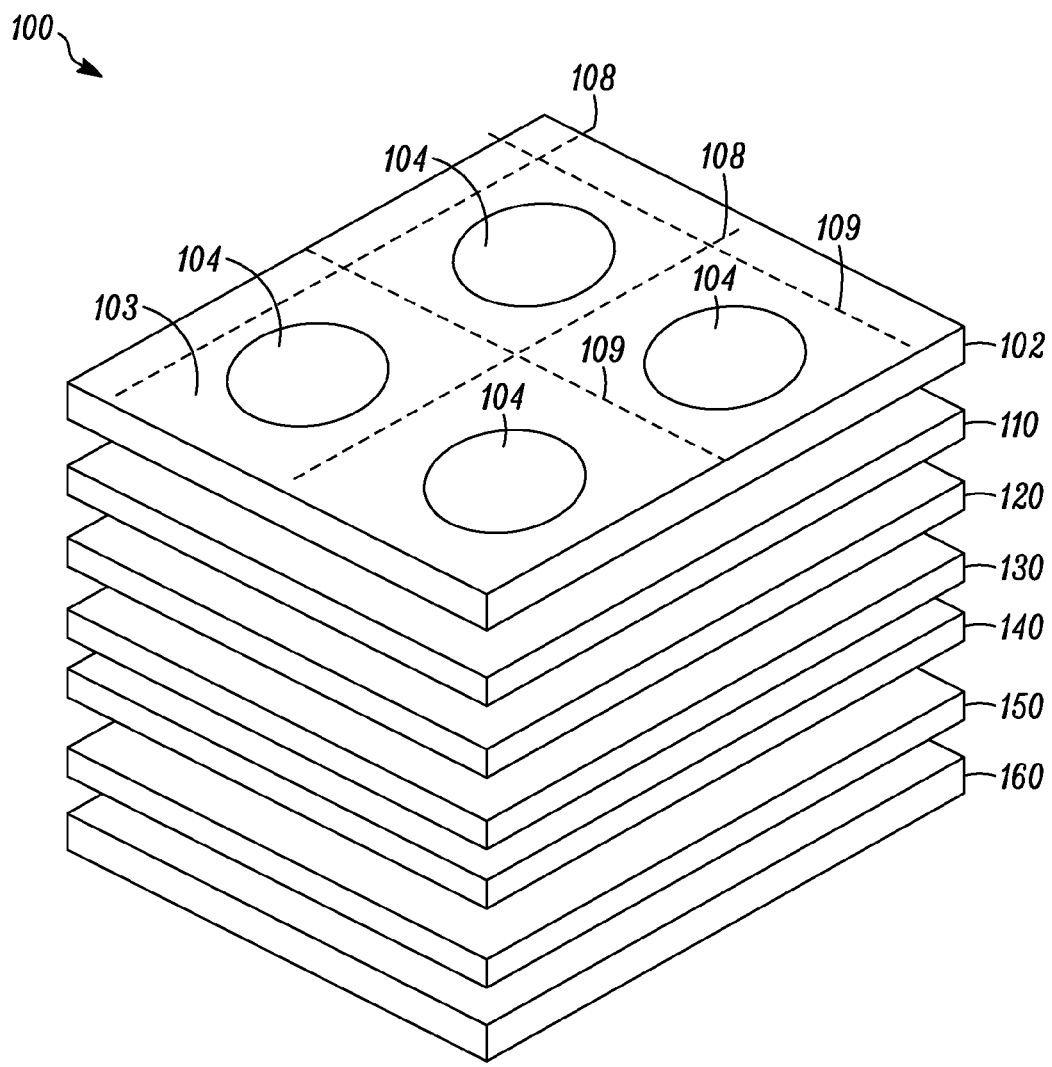
FIG. 1 illustrates an exploded view of a lens construct.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

In the following description, for purposes of explanation, numerous specific details are set forth to provide a thorough understanding of the invention. However, it will be apparent to one skilled in the art that the invention can be practiced without these specific details. In other instances, methods, structures and devices are shown in block diagram form in order to avoid obscuring the invention.

It is highly desirable to fabricate multiple-layer lens constructs from a stack of sheets having a plurality of laterally spaced lens features. Fabricating such multiple-layer lens constructs can include dispensing liquid adhesive patterned around each of the multitude of individual lens features on each sheet, or wafer. There are three major challenges presented when employing such techniques for the assembly of the array lens stack. These challenges include: overflow of liquid dispensed adhesive into the optical area between lenses upon assembly, resulting in distorted images when the lens stack is used with an imager; inconsistent wafer-to-wafer spacing making consistent optical performance unlikely; and incomplete bonding and resulting separation between the layers of the stack due to inconsistent adhesive deposition. These failures can lead to delamination of the stack, also referred to as separation of the layers, or chipping during the dicing process in singulation of lens stacks from the wafer, as well as an opportunity for the introduction of contaminants into the incompletely sealed stack. These problems with existing lens constructs are avoided by consistency of placement and thickness of adhesive.

An exploded view a lens stack 100 is shown in FIG. 1. The example lens stack 100 includes seven layers. A lens sheet 102, also referred to as a lens wafer, an optical member, or an optical sheet, is shown as the top of the stack. An adhesive layer 110, also referred to herein as an adhesive member, is positioned between the top lens sheet 102 and an intermediate lens sheet 120, also referred to herein as a lens wafer, an optical member, or an optical sheet. An adhesive layer 130, also referred to herein as an adhesive member, is positioned between intermediate lens sheet 120 and a spacer 140. An adhesive layer 150, also referred to herein as an adhesive member, is positioned between spacer 140 and lens sheet 160, which is the bottom of the stack. More or fewer layers may be employed in the stack to achieve the desired optical construct.

An optical member 102 is illustrated by example to include four optical features 104, and may be a lens sheet 102 including lenses or lens features 104. The lens sheet 102 can include any number of optical features. Each optical feature 104 in the illustrated example of a laminate lens stack is for a respective optical path. The lens sheet, or wafer, may be manufactured by any suitable means and of any suitable material for manufacture of optical lenses. For example, the lens sheet may be manufactured from glass, a polycarbonate, a composite, or any other suitable material for use in an optical lens. Each of the lens features 104 in the sheet 102 may be molded, grounded, or polished, or a combination thereof, to the precise desired shape in the sheet to provide the optical properties desire for the lens stack. The lens features may be different, formed to have different optical properties, or identical. In the illustrated example, a plurality of optical features 104 are lenses formed at uniformly laterally spaced locations in a planar sheet body 103. The lens elements are preferably uniformly spaced in the planar sheet body such that when diced, or cut, along planes 108 and 109, each respective lens is positioned in a corner of the resulting square or rectangular block, and adjacent the edges of the block. The planar sheet body 103 provides a planar surface for affixing to an adjacent layer as part of the construct of a multi-layer laminate lens stack. The dicing planes 108 and 109 are illustrated along sides of the lenses 104 to permit the positioning of four lenses in juxtaposition when the four lenses are assembled together for use with a single array imager (not shown).

Figure 2:
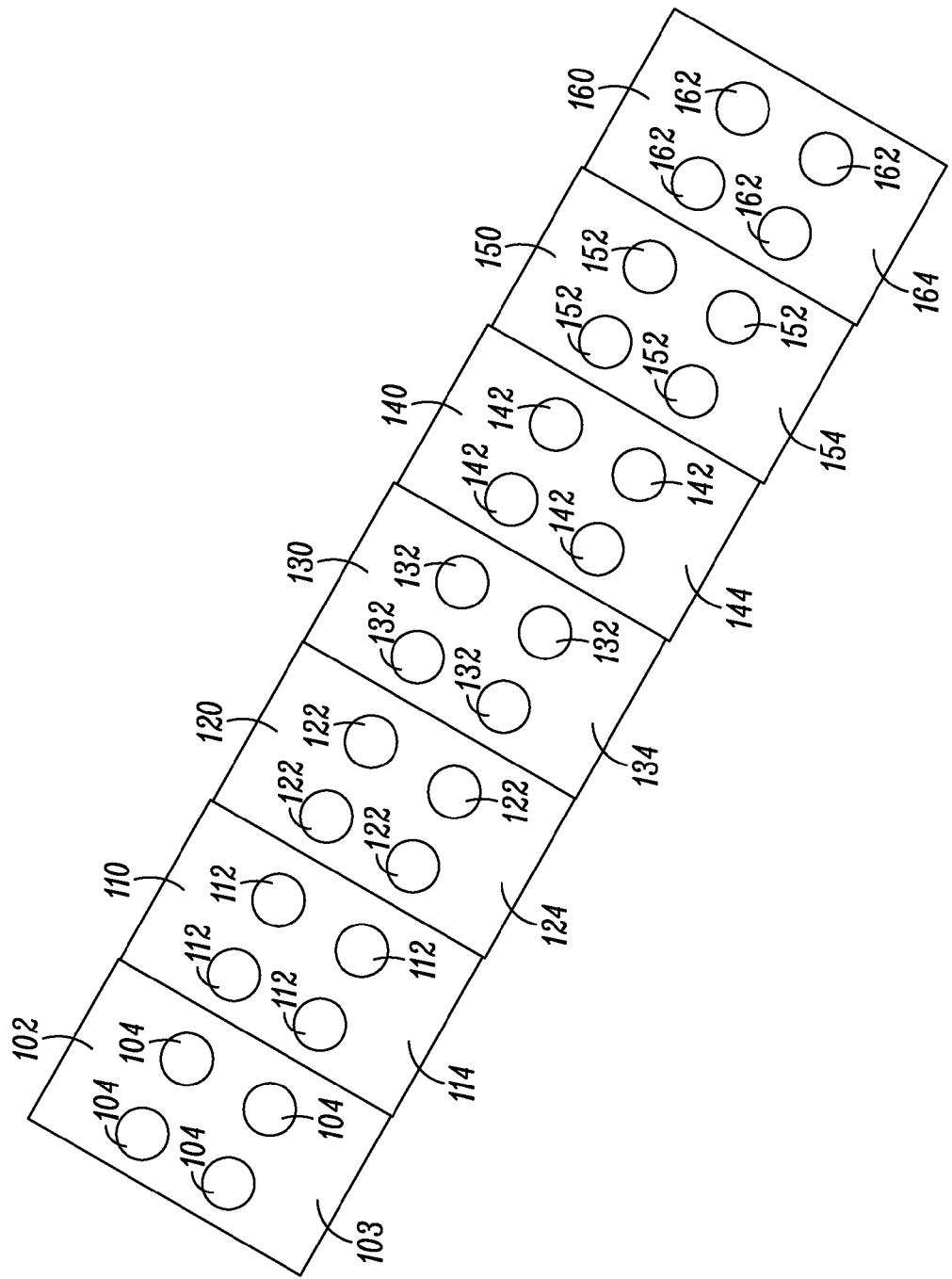
FIG. 2 illustrates the lens construct layers.
Figure 3:
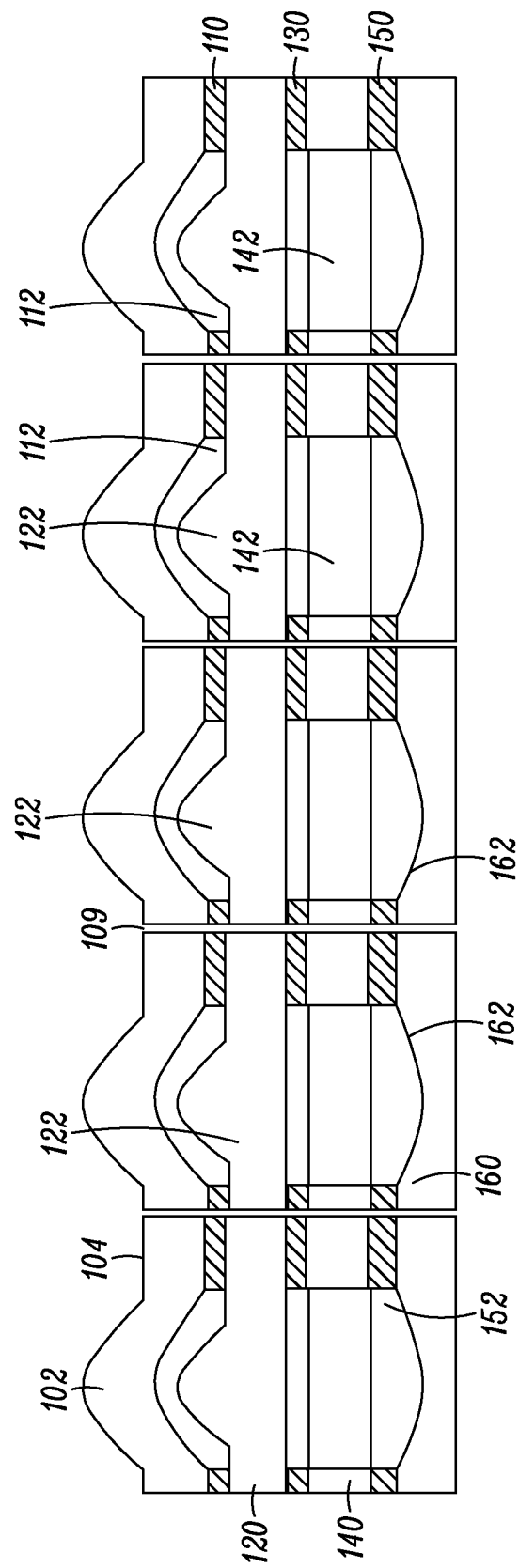
FIG. 3 illustrates a cross-section of a larger lens stack after dicing.
Figure 4:
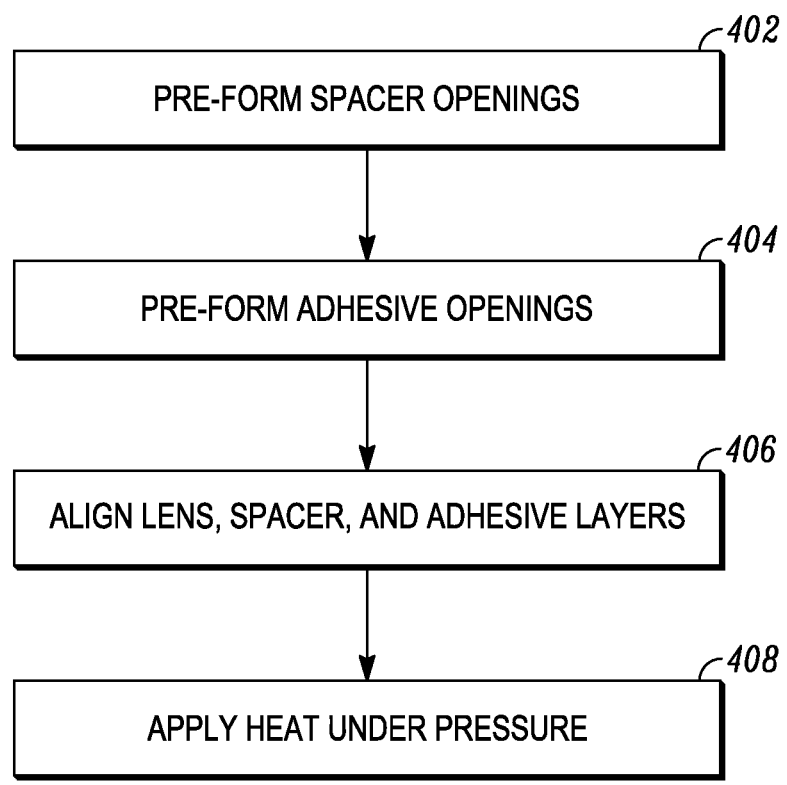
FIG. 4 is a flow chart for lens construction.

As shown in FIGS. 1 and 2, the adhesive layer 110 includes four apertures 112 in planar body 114, adhesive layer 130 includes four apertures 132 in planar body 134, and adhesive layer 150 includes four apertures 152 in planar body 154. The apertures 112, 132, and 152 are spaced uniformly at the same lateral spacing as lenses 104 in layer 102, for precise alignment with the four lenses 104 when the laminate lens stack is formed. The adhesive layers 110, 130, and 150, are preferably a pre-formed adhesive film constructed of materials such as, but not limited to, a B-staged thermosetting material or cross-linkable thermoplastic, a film with embedded spacers, such as rigid spheres (not shown) either alone or with a dimensionally stable carrier such as an internal polyimide layer to provide stable layer-to-layer thickness necessary to support the tight tolerances in the optical path. The apertures 112, 132, 152 in the adhesive film may be constructed via punching. Alternatively, and more preferably, the apertures 112, 132, 152 are advantageously laser cut from the body to remove the circular aperture cut-out from the adhesive sheet. The laser cutting process is advantageous as the laser locally cures the adhesive at the edge of the aperture, and thus the cured perimeter edge of the aperture creates a stop or dam that reduces or eliminates resin flow into the optical path of the lens stack during the lamination process. Other methods of sealing the aperture perimeter can be employed. Another optional process that can be employed during assembly is to apply a low energy surface treatment that is printed or sprayed onto the surfaces of the lenses 104 in the imager optical path so as to prevent wetting by the adhesive, further reducing potential for contamination by the deposited adhesive during lamination.

With continued reference to FIGS. 1 and 2, an optical member 120, which may be a lens sheet 120, is illustrated to include four optical features 122. The lens sheet can include any number of optical features, such as lenses, and each illustrated lens feature 122 in the example can be a single optical path for a respective single lens laminate stack. The lens sheet may be manufactured by any suitable means and of any suitable material for manufacture of optical lenses. For example, the lens sheet may be manufactured from glass, a polycarbonate, a composite, or any other suitable material for use in an optical lens. The lenses 122 in the sheet 120 may be molded, grounded, and polished, or a combination thereof, to the precise desired shape in the sheet to provide the optical properties desire for the lens stack. The lens features need not be identical, but the can be identical if desired. In the illustrated example, a plurality of lenses 122 are formed at uniformly laterally spaced locations in a planar sheet body 120. The lenses 122 are spaced uniformly on the sheet body 124 at the same spacing as lenses 104 in layer 102, for precise alignment with the four lenses 104 when the laminate lens stack is formed and may for example be axially aligned. The lens sheet body 124 provides a planar body for bonding with the adjacent lens body 102 and spacer body 134 in the lamination process.

The spacer 140 is illustrated to include four apertures 142. The spacer can include any number of apertures, each aperture in the illustrated example of a lens stack being for a respective single optical path of the lens laminate stack. The lens sheet may be manufactured by any suitable means and of any suitable material. For example, the lens sheet may be manufactured from glass, a polycarbonate, a composite, or any other suitable material that will withstand the lamination process and provide precise spacing for optical assembly. The apertures may be formed, cut, or punched in the spacer sheet. The apertures 142 are spaced uniformly on the sheet at the same lateral spacing as lenses 104 in layer 102, for precise alignment with the four lenses 104 when the laminate lens stack is assembled. The spacer body 144 provides a planar body for bonding with the adhesive layer to join adjacent lens sheets in the lamination process.

The optical member 160 is illustrated to include four optical features 162 in planar body 164. The lens sheet can include any number of features, and is illustrated to include four lens features, each illustrated lens feature 162 in the example of a lens stack being for a respective single lens laminate stack. The lens sheet may be manufactured by any suitable means and of any suitable material for manufacture of optical lenses. For example, the lens sheet may be manufactured from glass, a polycarbonate, a composite, or any other suitable material for use in an optical lens. The lenses, or lens features, or optical features, 162 in the sheet 160 may be molded, grounded, or polished, or a combination thereof, to the precise desired shape in the sheet to provide the optical properties desire for the lens stack. In the illustrated example, a plurality of lenses 104 are formed at uniformly spaced locations in a planar sheet body 103. The lenses 162 are spaced uniformly on the sheet body 164 at the same spacing as lenses 104 in layer 102, for precise alignment with the four lenses 104 when the laminate lens stack is assembled. The lens sheet body 164 provides a planar body for bonding with the adhesive layer to join adjacent lens sheets in the lamination process.

The adhesive and spacer thicknesses are critical to control both consistent spacing and resin flow. A preferred embodiment employs a preformed adhesive film. This preformed adhesive allows for the deposition of the adhesive in a single operation, greatly reducing the cycle time and number of opportunities for defects significantly. Increased precision is achieved by the dimensional control to meet critical tolerances across all aspects of the assembly.

Each of the layers has features with the same lateral spacing to permit alignment of respective optical paths when the lamination is made, and may for example have axial alignment throughout the stack.

The lamination of the pre-form adhesive to the glass wafers and spacer can be accomplished through a thermal and pressure exposure, with temperatures in the range of 25 C to 200 C and pressures ranging from 5-500 psi, dependent upon the specific adhesive chosen. This technique is applicable to both lens-to-lens bonding as well as lens-to-optical spacer, should such a standoff in the optical path be required or desired.

In addition, to protect against the film adhesive pre-form composition lacking sufficient initial tack to hold the parts in alignment prior to or during assembly bonding, a supplemental process may be added to insure alignment is maintained throughout manufacture of the complete construct. One optional process employs a secondary adhesive, also referred to herein as an alignment adhesive. One or more additional holes are provided in the pre-formed adhesive layer, which holes are in addition to the apertures for the optical path through the lens stacks. The additional holes, which are spaced laterally from the optical path, provide an opening for a second compressible adhesive to be dispensed. A material such as, but not limited to, a low durometer UV-curable adhesive can be dispensed into the additional adhesive holes. Once the lens components are aligned, the secondary adhesive is cured to hold the lens wafers in X-Y alignment during handling and throughout curing. The primary lens assembly adhesive layers, 110, 130, 150, are then cured according to their bonding requirements, compressing the alignment adhesive and relieving the alignment adhesive of its temporary function. An alternative to the addition of an alignment adhesive is to use localized spot curing of the primary adhesive through use of a spot cure mechanism. For example, a laser output may be applied to spots of the primary adhesive, generating a thermal process which will allow the primary adhesive, layers 110, 130, 150, to hold the in alignment during handling and throughout curing. The adhesive is then cured according to its bonding requirements to achieve the final cure, providing adhesion, sealing of the optical cavity, and maintaining dimensional control for the optimal optical path.

The structure and process described herein permits precise spacing of optical features in multiple layers of an optical stack. The construct enables reliable production of a plurality of lenses with precision and uniformity for the resulting optical paths.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for assembling a laminate lens stack, wherein the laminate lens stack includes:
   at least one first thermosetting adhesive member having at least one first adhesive member aperture;
   at least one first optical member, the at least one first optical member having at least one first optical member lens feature; and
   at least one second optical member, the at least one second optical member having at least one second optical member lens feature;
   the method comprising:
      forming at least one first additional hole in the in the at least one first thermosetting adhesive member, wherein the at least one first additional hole is spaced laterally from the at least one first adhesive member aperture and is configured to receive a compressible adhesive;
      curing edges of the at least one first adhesive member aperture;
      positioning the at least one first thermosetting adhesive member between the at least one first optical member and the at least one second optical member, with the at least one first adhesive member aperture aligned with the at least one first optical member lens feature and the at least one second optical member lens feature; and
      setting the at least one first thermosetting adhesive member.

2. The method as defined in claim 1, wherein the laminate lens stack further includes:
   at least one second adhesive member having at least one second adhesive member aperture; and
   at least one third optical member, the at least one third optical member having at least one third optical member lens feature;
   and wherein the method further comprises:
      forming at least one second additional hole in the in the at least one second adhesive member, wherein the at least one second additional hole is spaced laterally from the at least one second adhesive member aperture and is configured to receive the compressible adhesive;
      curing aperture edges of the at least one second adhesive member aperture;
      positioning the at least one second adhesive member between the at least one second optical member and the at least one third optical member, with the at least one second adhesive member aperture aligned with the at least one second optical member optical feature and the at least one third optical member optical feature; and
      pressing together, to form the laminate lens stack, the at least one first optical member, the at least one first thermosetting adhesive member, the at least one second optical member, the at least one second adhesive member, and the at least one third optical member.

3. The method as defined in claim 2, wherein the laminate lens stack further includes:
   at least one third adhesive member including at least one third adhesive member aperture; and
   at least one spacer including at least one spacer aperture;
   and wherein the method further comprises:
      forming at least one third additional hole in the in the at least one third adhesive member, wherein the at least one third additional hole is spaced laterally from the at least one third adhesive member aperture and is configured to receive the compressible adhesive;
      curing aperture edges of the at least one third adhesive member aperture;
      positioning the at least one spacer and the at least one third adhesive member between the at least one second adhesive member and the at least one third optical member, with the at least one spacer aperture aligned with the at least one second adhesive member aperture, the at least one third optical member lens feature, and the at least one third adhesive member aperture; and wherein the pressing together, to form the laminate lens stack, includes pressing together the at least one spacer and the at least one third adhesive member.

4. The method as defined in claim 3, the method further including:

forming the at least one first adhesive member aperture, the at least one second adhesive member aperture, and the at least on third adhesive member aperture by laser cutting.

5. The method as defined in claim 2, the method further including:

forming the at least one first adhesive member aperture and the at least one second adhesive member aperture by laser cutting.

6. The method as defined in claim 2, the method further including dicing the laminate lens stack into a rectangular shape along edges of the at least one first optical member lens feature to position the at least one first optical member lens feature in a corner.

7. The method as defined in claim 1, the method further including:

forming the at least one first adhesive member aperture by laser cutting the at least one first thermosetting adhesive member.

8. The method as defined in claim 1, the method further including dicing the laminate lens stack into a rectangular shape along edges of the at least one first optical member lens feature, whereby a lens is positioned in a corner of the laminate lens stack.

9. The method as defined in claim 1, the method further including heating the laminate lens stack to elevate a temperature of the at least one first thermosetting adhesive member while applying pressure.

10. The method as defined in claim 1, the method further including applying a low surface energy treatment to the at least one first optical member lens feature and the at least one second optical member lens feature.

11. The method as defined in claim 1, the method further including spot pre-curing at least one location of the at least one first thermosetting adhesive member to align the laminate lens stack during the curing.

12. The method as defined in claim 1, the method further including applying a laser output to at least one spot of the at least one first thermosetting adhesive member to pre-cure at least one location of the at least one first thermosetting adhesive member and to maintain alignment of the laminate lens stack during thermosetting.

13. The method as defined in claim 1, the method further including using an ultraviolet curable low durometer material to hold alignment during thermal cure processing.

14. A laminate lens stack, including:

at least one first adhesive member having at least one first adhesive member aperture and at least one first additional hole, wherein the at least one first additional hole is spaced laterally from the at least one first adhesive member aperture and from all optical paths of the laminate lens stack;

at least one first optical member, the at least one first optical member having at least one first optical member lens feature; and at least one second optical member, the at least one second optical member having at least one second optical member lens feature;

wherein the at least one first adhesive member aperture is aligned with the at least one first optical member lens feature and the at least one second optical member lens feature.

15. The laminate lens stack according to claim 14, further including:

at least a second adhesive member having at least one second adhesive member aperture and at least one second additional hole, wherein the at least one second additional hole is spaced laterally from the at least one second adhesive member aperture and from the all optical paths of the laminate lens stack; and at least one third optical member, the at least one third optical member having at least one third optical member lens feature;

the at least one second adhesive member positioned between the at least one second optical member and the at least one third optical member, with the at least one second adhesive member aperture aligned with the at least one second optical member optical feature and the at least one third optical member optical feature.

16. The laminate lens stack according to claim 15, further including:

at least one third adhesive member including at least one third adhesive member aperture and at least one third additional hole, wherein the at least one third additional hole is spaced laterally from the at least one third adhesive member aperture and from the all optical paths of the laminate lens stack; and at least one spacer including at least one spacer aperture;

wherein the at least one spacer and the at least one third adhesive member are positioned between the at least one second adhesive member and the at least one third optical member, with the at least one spacer aperture aligned with the at least one second adhesive member aperture, the at least one third optical member lens feature, and the at least one third adhesive member aperture.

* * * * *